March 20, 1934.   K. E. ZEIDLER   1,951,385
FRICTION SHOCK ABSORBING MECHANISM
Filed April 6, 1932   2 Sheets-Sheet 1

Inventor
Kurt E. Zeidler
By Joseph Harris
His Atty.

March 20, 1934.　　　K. E. ZEIDLER　　　1,951,385
FRICTION SHOCK ABSORBING MECHANISM
Filed April 6, 1932　　　2 Sheets-Sheet 2
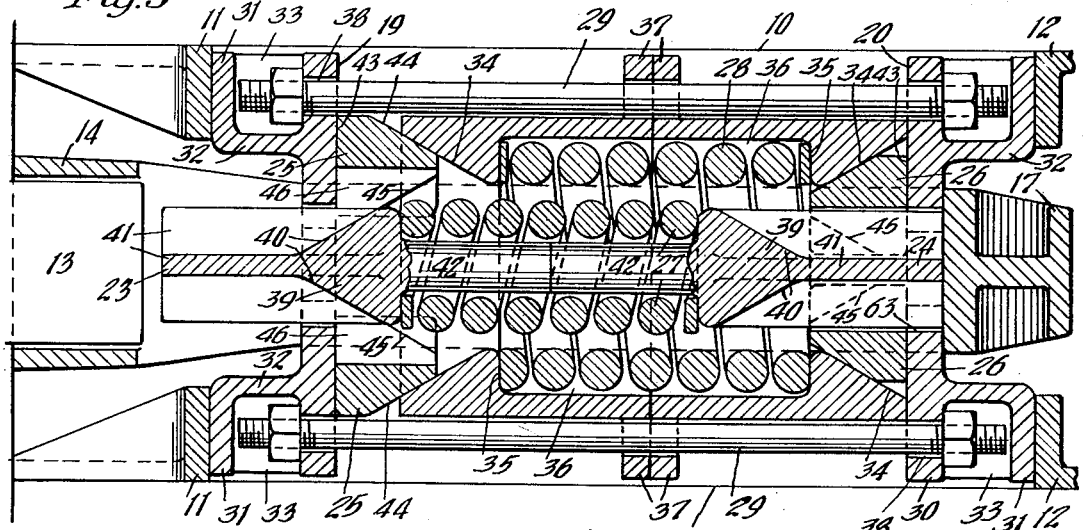
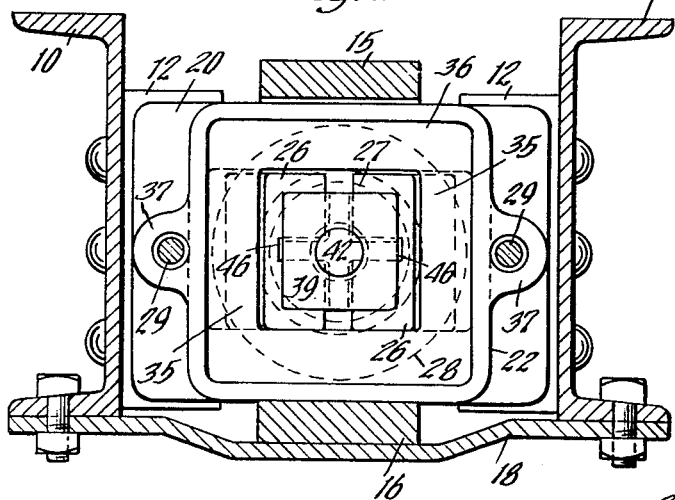
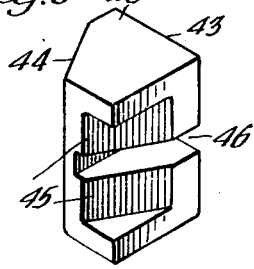
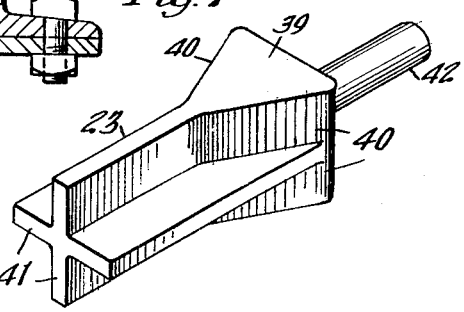
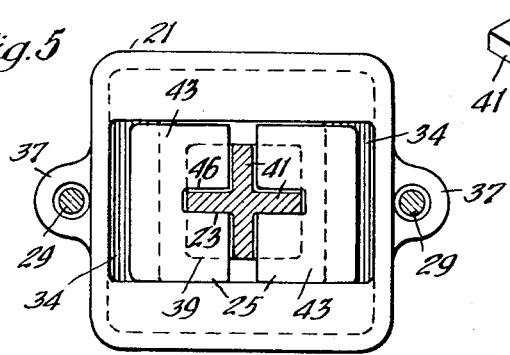
Inventor
Kurt E. Zeidler
By Joseph Harris
his Atty.

Patented Mar. 20, 1934

1,951,385

UNITED STATES PATENT OFFICE 1,951,385

FRICTION SHOCK ABSORBING MECHANISM

Kurt E. Zeidler, Chicago, Ill.

Application April 6, 1932, Serial No. 603,528

14 Claims. (Cl. 213—24)

This invention relates to improvements in friction shock absorbing mechanisms, and more particularly to such mechanisms especially adapted for use in railway draft riggings.

One object of the invention is to provide a simple and efficient shock absorbing mechanism having high capacity and a relatively large amount of friction surfaces operating under moderate pressures per unit of area, whereby to minimize wear of the parts.

Another object of the invention is to provide a friction shock absorbing mechanism of the double ended type wherein a preliminary spring action only is obtained for a predetermined initial portion of a compression stroke, the preliminary spring action being then followed by a friction action, the friction action taking place at that end of the mechanism remote from the end where the actuating pressure is applied.

Another object of the invention is to provide a mechanism of the character indicated wherein pressure applied in one direction at one end of the mechanism is resolved into oppositely exerted forces within the mechanism to thereby distribute the loads to both ends of the mechanism.

Another object of the invention is to provide, in an assembled unit, a friction shock absorbing mechanism adapted to be disposed between front and rear stop-acting means with the parts so arranged and operating that the over-all length of the unit assembly remains constant at all times and wherein the loads are adapted to be distributed in either a buffing or pulling action to the stop-acting means at both ends simultaneously.

Other objects of the invention will more clearly appear from the description and claims hereinafter following.

Figure 1:
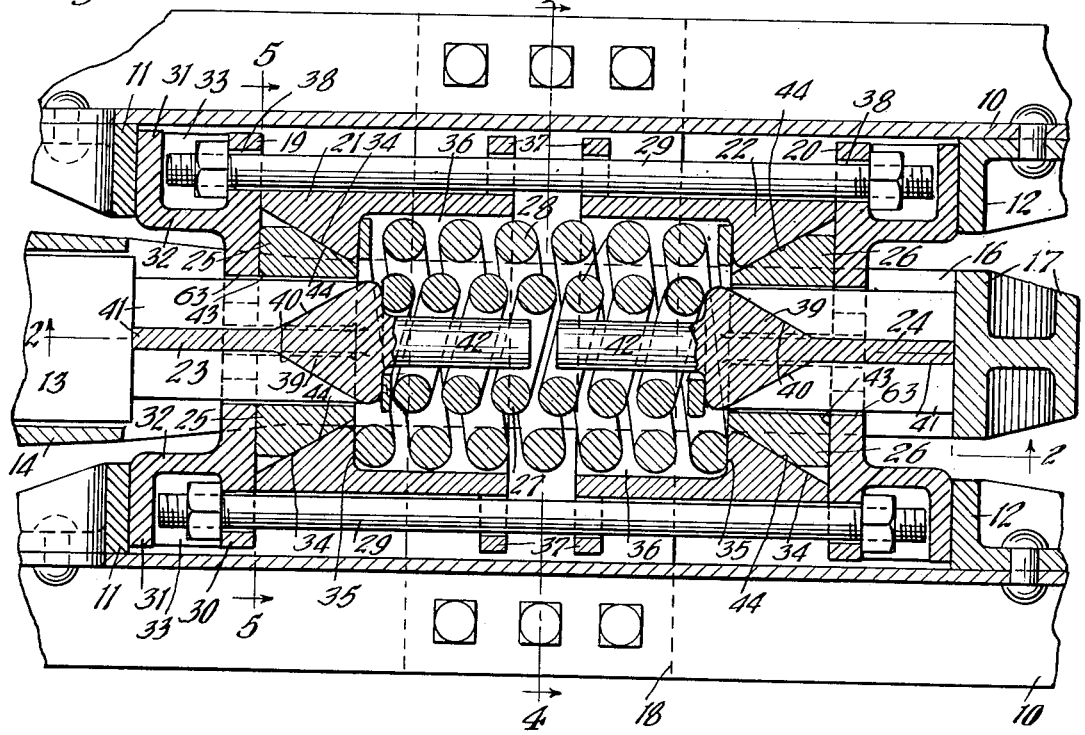
Figure 2:
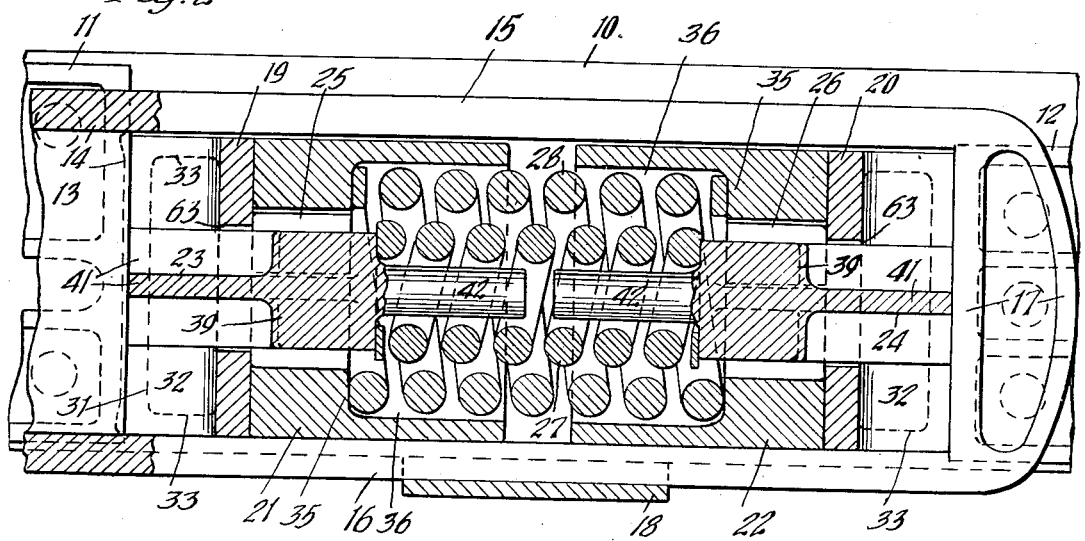

In the drawings forming a part of this application, Figure 1 is a horizontal, longitudinal sectional view of a portion of a railway draft rigging showing the improvements incorporated therein, the mechanism being in full release. Figure 2 is a vertical, longitudinal sectional view corresponding to the line 2—2 of Figure 1. Figure 3 is a view similar to Figure 1 but illustrating the condition of the parts at the end of a draft or pulling action. Figure 4 is a vertical transverse sectional view, corresponding to the line 4—4 of Figure 1. Figure 5 is a similar transverse sectional view corresponding to the line 5—5 of Figure 1. Figure 6 is a detailed perspective of one of the friction shoes and Figure 7 a detailed perspective of one of the wedge plungers used in the mechanism.

In said drawings, 10—10 denote the usual channel center sills of a railway car to the inner faces of which are secured front stop lugs 11—11 and rear stop lugs 12—12. A portion of the butt end of a coupler is indicated at 13, the same being adapted for key connection to the hooded end 14 of a vertical yoke having top and bottom arms 15—16 and vertical rear connecting section 17. The yoke and mechanism therewithin are adapted to be supported in operative position by a saddle plate 18 detachably bolted to the lower flanges of the sills 10.

The improved mechanism, as shown, comprises, broadly, front and rear followers 19 and 20; front and rear friction shells 21 and 22; front and rear wedge pressure-transmitting elements or plungers 23 and 24; front and rear sets of wedge friction shoes 25—25 and 26—26; a common preliminary spring 27; a main spring 28; and connecting retainer bolts 29—29.

Inasmuch as the parts are duplicated at each end of the mechanism, a detailed description of the parts at the front end of the mechanism is deemed sufficient.

The follower 19 comprises a main transversely extending section 30 of the usual rectangular form and on the outer side thereof is provided with forwardly offset flanges 31—31 at each side, integrally connected by webs 32—32 and top and bottom horizontal bracing webs 33—33, thus forming two laterally open vertical pockets on each side thereof. The main section 30 is centrally apertured at 63 in the form of a cross to accommodate the corresponding plunger 23 hereinafter described in detail.

The friction shell 21 is of generally rectangular formation as best shown in Figure 5, the same having a heavy thickened rectangular mouth with opposed inclined friction surfaces 34—34 on each side, said surfaces converging inwardly toward the center of the mechanism and providing inner shoulders 35—35 for the adjacent end of the main spring 28. Rearwardly of the bell or tapered friction mouth, the shell is formed with a rectangular spring cage section 36 for partially housing and centering the spring 28. At its inner end, the shell is formed with laterally extended lugs 37 perforated to accommodate the retainer bolts 29 which are passed therethrough and also through corresponding alined openings 38 in the main sections of the followers. With this arrangement, it is evident that the parts may be held assembled and handled as a unit; the over-all length maintained at the desired point; and the parts put under an initial compression by suitably adjusting the nuts on the bolts.

Each wedge pressure transmitting plunger is formed with a main wedge section 39 having outwardly converged wedge friction surfaces 40—40 from which is extended outwardly a cross shaped, pressure transmitting section 41, the latter extending through the similar opening 63 of its corresponding follower, the section 41 being extended beyond the follower a distance corresponding to the permissible full stroke of the mechanism. On the opposite side of the wedge section 39, is integrally formed a cylindrical plunger 42, which serves to center the preliminary spring 27 and also to transmit pressure to the wedge plunger at the opposite end of the mechanism, as hereinafter described. As clearly shown in Figure 1, the ends of the preliminary spring 27 bear against the shoulders provided by the wedge sections 39.

Each of the friction shoes 25 (and 26) is formed on its front side with a flat friction surface 43 bearing on the opposed surface of the corresponding follower. On its outer side, each friction shoe is formed also with a wedge friction surface 44 cooperable with the corresponding shell friction surface 34 and, on its inner side, is provided with a wedge friction surface 45 cooperable with the corresponding opposed wedge friction surface 40. Each friction shoe is suitably slotted, an indicated at 46, to accommodate the corresponding arm of the wedge plunger.

The normal or full released condition of the parts is as illustrated in Figures 1 and 2, where it will be seen that the inner ends of the friction shells 21 and 22 are normally separated a distance corresponding to the full compression stroke of the mechanism, less the amount of preliminary spring action. The opposed ends of the plungers 42 are normally spaced a distance corresponding to the desired preliminary spring action and, further, the outer ends of the friction shell 21 and 22 are normally in engagement with the respective followers 19 and 20.

The operation is as follows, assuming a draft or pulling stroke. As the yoke moves outwardly or to the left, as viewed in Figures 1 and 3, the inner end section 17 of the yoke engages the outward end of the cross portion of the rear wedge plunger 24 and moves the same forwardly simultaneously and equally with the movement of the yoke. As this movement continues, the first action is a preliminary spring action resulting from the compression of the spring 27, which continues until the two plungers 42—42 engage. During this portion of the compression stroke, there will be no appreciable outward or forward movement of the front wedge plunger 23. After the plungers 42 engage, continued movement of the yoke in the same direction will induce a corresponding and equal movement of the front wedge plunger 23, which in turn forces a lateral separation of the two front wedge shoes 25, the lateral separation of the latter in turn forcing a rearward movement of the front friction shell 21 against the yielding resistance of the main spring 28. The action continues until the end of the compression stroke when the front friction shell 21 comes into engagement with the rear friction shell 22, as shown in Figure 3.

From the preceding description, it wi'l be seen that, on a draft stroke, the initial preliminary spring action is succeeded by a friction action, the friction being generated on the cooperating wedge friction surfaces 40 and 45; on the friction surfaces 43 of the front shoes and inner surface of the front follower; and between the surfaces 44 and 34 of the front shoes and front shell respectively. It will also be observed that during this action, the actuating pressure applied in a forward direction at the rear end of the mechanism is ultimately converted into two forces operating simultaneously in opposite directions and transmitted to both the front and rear followers, the latter always remaining in engagement with their respective stop lugs. As will be obvious to those skilled in the art, in a buff action, the operation is reversed, the actuating pressure being applied at the front end and the friction action taking place at the rear end. In release, it is evident that the preliminary spring 27 is free to act on that plunger first directly actuated which is under no frictional load, thus relieving the pressure on the other wedge plunger and permitting it to be readily retracted and thus in turn relieving the friction shoes which have been actuated and the corresponding friction shell until all the parts return to full released condition.

With the arrangement shown, relatively large friction wearing areas are provided; the required pressure per unit of area is maintained within reasonable limits; the wear of the mechanism is distributed to both friction units, one set of units taking all the draft actions and the other set all the buff actions; the loads are well distributed to all of the parts; an easy graduated action is obtained; and all of the parts may be manufactured at relatively small expense.

In the drawings are illustrated what is now considered the preferred embodiment of the invention but, as will be obvious to those skilled in the art, various changes and modifications may be made without departing from the spirit of the invention and all such changes and modifications are contemplated that come within the scope of the claims appended hereto.

I claim:

1. In a friction shock absorbing mechanism, the combination with front and rear follower-acting means; of front and rear friction shells; a set of friction members cooperable with each shell each said set including an element arranged to directly receive an actuating pressure independently of the follower-acting means; spring means between the sets of friction members; and means for transmitting pressure applied to either of said friction elements at one end of the mechanism to and actuating the friction members at the opposite end of the mechanism.

2. In a friction shock absorbing mechanism, the combination with front and rear follower-acting means; of front and rear friction shells; a set of friction members cooperable with each shell each said set including an element arranged to directly receive an actuating pressure independently of the follower-acting means; spring means between the sets of friction members; and means for transmitting pressure applied to either of said friction elements at one end of the mechanism to and actuating the friction members at the opposite end of the mechanism, said friction shells being normally longitudinally separated and adapted to relatively approach each other during a compression stroke.

3. In a friction shock absorbing mechanism, the combination with front and rear followers; of a friction unit on the inner side of each follower, each unit including a friction shell independent of and separable from its adjacent follower, wedge friction elements and a direct pressure receiving and transmitting element movable independently of its corresponding follower, spring means between the friction units; and means for transferring an actuating pressure applied to the pressure-transmitting element at one end to and actuating the friction unit at the opposite end of the mechanism.

4. In a friction shock absorbing mechanism, the combination with front and rear followers; a friction unit including a friction shell and wedge friction elements cooperable therewith, associated with each follower; preliminary and main springs interposed between the units; and means, operative during a compression stroke after the preliminary spring has been compressed, for actuating the friction unit on that end of the mechanism remote from the end at which the actuating pressure is applied.

5. In a shock absorbing mechanism having front and rear stop-acting means, the combination with front and rear followers always maintained in engagement with said stop-acting means; front and rear, normally separated friction shells; wedge friction shoes cooperable with each shell; spring means between the sets of wedge friction shoes; and means, operative when actuating pressure is applied in one direction longitudinally of the mechanism at either end thereof, for resolving said pressure into oppositely-acting forces exerted simultaneously against the two followers.

6. In a friction shock absorbing mechanism, the combination with front and rear stationary followers; of normally separated, front and rear friction units in engagement with the respective opposed faces of the followers; spring means common to and interposed between the friction units; and means, operative when actuating pressure is applied lengthwise of the mechanism in one direction at one end, for resolving said pressure into two oppositely and simultaneously exerted forces against the followers.

7. In a friction shock absorbing mechanism, the combination with front and rear stationary followers; of normally separated, front and rear friction units in engagement with the respective opposed faces of the followers; spring means common to and interposed between the friction units; means, operative when actuating pressure is applied lengthwise of the mechanism in one direction at one end, for resolving said pressure into two oppositely and simultaneously exerted forces against the followers; and means for retaining the followers and interposed devices in assembled relation.

8. In a friction shock absorbing mechanism, the combination with front and rear followers; of a pressure-transmitting plunger associated with each follower and having a portion thereof normally extended outwardly of the follower; friction shoes laterally slidable upon and frictionally cooperable with each follower on its inner side; friction shells having inwardly converged friction surfaces cooperable with the friction shoes, said shells being separable from the respective adjacent followers; and spring means common to both sets of friction shoes and shells.

9. A double ended friction shock absorbing mechanism comprising, at each end thereof, a follower, friction shoes cooperable therewith, a friction shell cooperable with the shoes, and a pressure-transmitting wedge plunger extending through the follower; spring means interposed between the shells; and means for transmitting an actuating pressure from one of said wedge plungers to the other wedge plunger at the opposite end of the mechanism.

10. In a friction shock absorbing mechanism, the combination with two end followers; of a tapered mouth friction shell associated with each follower and normally in engagement therewith; a plurality of wedge friction shoes cooperable with each shell; a wedge pressure-transmitting element cooperable with each set of shoes; spring means interposed between the shells and pressure-transmitting elements; and means for transmitting the pressure applied to one of said elements to the other element at the opposite end of the mechanism.

11. In a friction shock absorbing mechanism, the combination with front and rear apertured followers; of a friction shell associated with each follower and having an inwardly tapered mouth; friction shoes cooperable with each shell, a wedge pressure-transmitting element associated with each set of friction shoes, each of said elements having a plunger section extended through the aperture of the corresponding follower and adapted to receive actuating pressure; and spring means interposed between the friction devices at the opposite ends of the mechanism.

12. In a shock absorbing mechanism having front and rear stop-acting means, the combination with apertured followers maintained in constant engagement with said means; a pair of oppositely disposed friction shells interposed between the followers and normally in engagement therewith and adapted for relative approach during a compression stroke; a spring resistance; and a plurality of friction elements cooperating with each shell, said elements including shoes frictionally engaging the corresponding follower and a pressure-transmitting element having one end thereof extended through the aperture in the follower and adapted to receive the actuating pressure.

13. In a friction shock absorbing mechanism, the combination with front and rear stops; of a follower in engagement with each set of stops; a tapered mouth friction shell normally in engagement with the inner side of each follower, the shells being separated in full release; a plurality of wedge friction shoes cooperable with each shell and corresponding adjacent follower; a pressure-transmitting wedge plunger cooperable with each set of friction shoes and normally extended outwardly through the aperture of the follower to receive the actuating pressure; a preliminary spring resistance interposed between the pressure-transmitting wedge plungers; and a main spring resistance interposed between the shells.

14. A friction shock absorbing mechanism in accordance with claim 13 wherein retainer bolts and extended through alined apertures in the followers and shells.

KURT E. ZEIDLER.